Dec. 19, 1950 W. R. BRAY 2,534,409
AUTOMATIC V BELT TRANSMISSION
Filed Nov. 29, 1946
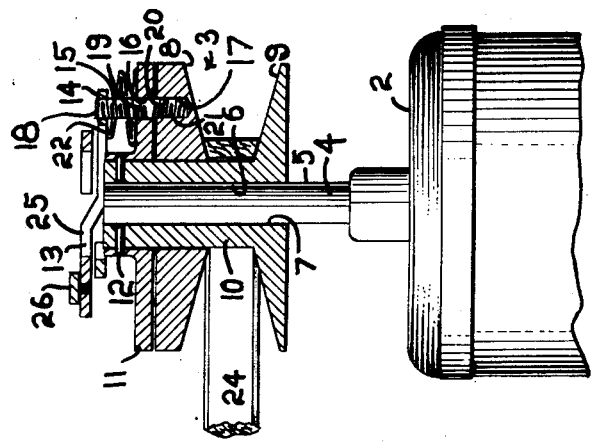
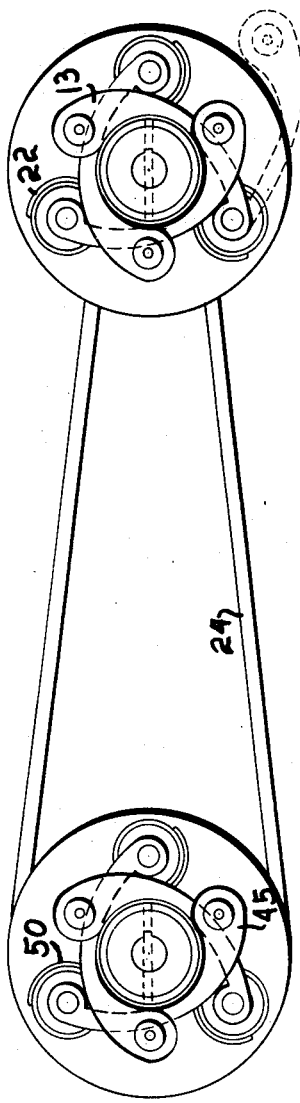
W. R. BRAY
Inventor
Lester B. Clark
&
Ray L. Smith
By
Attorney Patented Dec. 19, 1950

2,534,409

UNITED STATES PATENT OFFICE 2,534,409

AUTOMATIC V BELT TRANSMISSION

William R. Bray, Bryan, Tex.

Application November 29, 1946, Serial No. 712,945

4 Claims. (Cl. 74—230.17)

The invention relates to an automatic V belt transmission.

An object of the invention is to provide a V belt transmission with drive and driven pulleys having adjustable pulley groove widths.

Another object of the invention is to provide a V belt transmission wherein the pulleys operate as a function of their rotative speed to adjust their pulley groove widths so as to position the V belt thereon as a function of the speed of rotation of the pulleys.

A further object of the invention is to provide a V belt transmission wherein the V belt is positioned in the pulley grooves so as to obtain maximum starting torque.

A still further object of the invention is to provide a V belt transmission wherein the pulley groove width is adjustable as a function of the rotative speed of the pulleys to position the V belt thereon so as to obtain maximum power from the prime mover.

A further object of the invention is to provide a V belt transmission with drive and driven pulleys wherein the V belt is positioned in the pulley grooves as a function of the rotative speed of the pulleys, the driven pulley lagging slightly behind the drive pulley during acceleration so as to maintain the V belt taut.

Another object of the invention is to provide a V belt transmission having the pulley groove widths adjustable by double threaded screws operative as a function of the rotative speed of the pulleys to increase or decrease the pulley groove width.

A further object is to provide a V belt transmission with adjustable pulley groove widths, the pulley grooves being adjustable by double threaded screws secured to one pulley half and an end plate and centrifugally movable levers which operate as a function of the rotative speed of the pulleys, said screws having resilient means between the end plate and the levers to return the pulley halves to correct position for starting as the V belt transmission is stopped.

A still further object of the invention is to provide a V belt transmission with drive and driven pulleys wherein the V belt is positioned in the pulley grooves as a function of the rotative speed of the pulleys, the drive pulley lagging slightly behind the driven pulley during deceleration so as to maintain the V belt taut.

Other objects and advantages will become more apparent with a consideration of the following description considered in connection with the accompanying drawings wherein—

Fig. 1 is a front plan view of the V belt transmission showing the drive and driven members in starting position;

Fig. 2 is a section on line 2—2 of Fig. 1 showing the driven pulley with the centrifugally operative means thereon and the connection means from the end plate to the slidable pulley half;

Fig. 3 is a section on line 3—3 of Fig. 1 showing the drive pulley with the centrifugally operable means thereon to adjust the pulley groove width as a function of the rotative speed of the pulley.

In Fig. 3, the prime mover 2 is connected to the drive pulley 3 by means of the shaft 4. A longitudinal key 5 on the outer surface of the shaft engages a keyway 6 in bore 7 of pulley 3 to position the pulley to rotate with the shaft.

The drive pulley 3 comprises two beveled plates, or pulley halves 8 and 9. The pulley half 9 is compelled to rotate with the shaft by a key 5 and a keyway 6. A hub 10 extends from the pulley half 9 and is in the form of a cylindrical extension.

The corresponding pulley portion 8 is slidably mounted on the hub 10, or if the pulley half 9 is connected onto the shaft 4, it is slidably mounted on the shaft. An end plate 11 fixed on hub 10 by pins 12, which hub is in turn secured to the shaft 4 as previously described, is provided with the levers 13 pivoted at 14 to the double threaded screws 15, which screws pass through the holes 16 provided therefor, and into the hole 17 in pulley half 8. The screws 15 are provided with a right hand threaded portion 18 at the upper end thereof to engage right hand threads 19 in hole 16 of end plate 11. The lower end of the screw 15 is provided with a left hand threaded portion 20 to engage the left hand threads 21 of hole 17 in the pulley half 8. A spring 22 disposed between the end plate 11 and the lever 13 around screws 15 tend to retain the screws 15 in outermost position so that the V belt 24 rides inwardly toward the axis of rotation of the shaft 4 when the prime mover is started.

The levers 13 are provided with an upstanding portion 25 on the outer end thereof so that as they move outwardly due to centrifugal force, the levers will pass over the pivot connection 14 of the adjacent lever. Weights 26 on such upstanding portion serve to increase the weight of the levers 13 and to increase the sensitivity of the levers in operation. It seems obvious that the tension spring 22 may be varied in strength, or the weights 26 increased or decreased to vary the range of sensitivity of the device as used with various sizes of prime movers.

The driven pulley 30 is connected to a driven shaft 31 by key 32 and key way 33 in the hub 35 of pulley half 36. The slidable pulley half 37 is similar to pulley half 8 of the drive pulley 3, and is likewise connected to the end plate 38 by a screw 39 having a right hand threaded portion 40 to engage a thread in hole 41 of the pulley half 37, and a left hand threaded portion to engage threads 42 of hole 43 in the plate 38.

The pins 44 through the collar of end plate 38 secures the end plate to the hub 35 which in turn is secured to the shaft by the key 32 as above described.

Levers 45, pivotally connected to the screws 39, have upstanding portions 46 and weights 47 thereon which are similar to the levers 13 previously described in regards to the drive pulley. A tension spring 50 positioned around the screws 39 between the end plate 38 and the slidable pulley half 37 tends to retain the levers 45 in static position. The tension in such springs or the weight of the levers 45 may be varied to obtain different ranges of sensitivity.

It is to be noted that three centrifugal levers are shown on the end plates. However, it seems obvious that any suitable number may be employed to accomplish the desired result.

The device is so arranged, that as the prime mover is accelerating and during normal running, the driven pulley will lag slightly behind the drive pulley so that the V belt at all times remains taut. However, as the device is decelerated, the drive pulley lags behind the driven pulley so that the V belt remains taut during such deceleration.

As shown in the accompanying drawing, the V belt transmission assembly is in starting position. On the drive pulley, the spring 22 retains the levers 13 in an innermost position and the V belt is shown as riding inwardly in the groove towards the axis of rotation.

The V belt on the driven pulley is in opposite position with relation to that of the drive member. The levers are moved inwardly against the end plate 38 while the pulley half 37 has been moved inwardly by this action in conjunction with the left hand portion 42 moving out of hole 43 in the pulley half 37. This narrows the pulley groove so that the V belt moves away from the axis of rotation of the pulley.

With the V belt close to the axis of rotation of the shaft 4 of the prime mover, maximum starting torque of the prime mover is thereby utilized to effect rotation of the driven shaft.

As the driven pulley picks up speed from the drive pulley, levers 45 pivot outwardly so as to rotate screw 39 in such a manner that the screw moves into the hole 41 of pulley half 37 while moving outwardly through the hole 43 of end plate 38, the net result being that slidable pulley half 37 recedes from pulley half 36 so that the pulley groove width will increase, causing the V belt to move in toward the axis of rotation.

Similarly, slidable pulley half 8 of the drive pulley moves toward pulley half 9 when the pulley reaches a predetermined speed so that the levers 13 pivot outwardly as seen in dotted line in Fig. 1.

In this manner, a V belt transmission system is provided wherein, maximum starting torque of the prime mover is utilized at starting and the rotative speed of the pulleys is used to position the V belt in the groove of the pulley. The hub 10 could be eliminated by connecting the pulley half 9 directly onto the shaft 4.

Broadly the invention contemplates a V belt power transmission assembly including drive and driven pulleys wherein the rotation of the pulleys is utilized to position the V belt in the pulley grooves.

The invention claimed is:

1. A V belt transmission comprising drive and driven pulleys, each of said pulleys including a pair of beveled plates forming a pulley groove therebetween, means to adjust the width of the pulley groove so as to determine the position of the V belt thereon as a function of the speed of rotation of the pulley comprising a member mounted in spaced relation to said beveled plates, a lever on said member, said lever being movable by centrifugal force, and means connecting said member to one of said pulley plates to adjust the relative position of said plates as a function of the rotative speed, said means including a threaded screw connected to said lever and passing through said member into said pulley plate, the threads on one end thereof being opposed to the threads on the opposite end thereof, whereby rotation of said lever by centrifugal force rotates said screw so as to move said connected pulley half.

2. A V belt transmission comprising, drive and driven shafts, means to rotate said drive shaft, a pulley half mounted on each of said shafts, a second pulley half slidably mounted on each of said shafts and forming a pulley groove with said first pulley half, means to adjust the distance between said pulley halves so as to determine the position of a V belt thereon as a function of the speed of rotation of the pulley comprising, a member mounted on each of said shafts, means to connect said member to said slidable second pulley half, an additional means on said member secured to said connecting means and movable by centrifugal force to adjust the relative position of said pulley halves as a function of the rotative speed.

3. A V belt transmission comprising, drive and driven shafts, pulleys mounted on said shafts, said pulleys each including a pair of beveled plates forming a pulley groove therebetween, one of said plates being slidably mounted on each of said shafts, means to adjust the width of the pulley groove so as to determine the position of the V belt thereon as a function of the speed of rotation of the pulley comprising, a member mounted on said shaft and threadedly connected to said slidable plate, a portion of said member movable by centrifugal force to move said plate along said threaded connection to adjust the relative position of said plates as a function of the rotative speed.

4. A V belt transmission comprising, a shaft, a pulley half mounted on said shaft, a second pulley half axially slidable relative to said first pulley half forming a pulley groove therebetween, means to adjust the width of the pulley groove by changing the relative axial position of said halves so as to determine the position of the V belt thereon as a function of the speed of rotation of the pulley comprising, a member mounted to rotate with said pulley, means connecting said member to said second pulley half, means on said member secured to said connecting member movable by centrifugal force, said connecting means including a threaded screw passing through said member and into said second pulley half, the threads on one end thereof being opposed to the threads on the opposite end thereof whereby rotation of said means movable by centrifugal force rotates said threaded connecting means to adjust the relative position of said pulley halves as a function of the rotative speed.

WILLIAM R. BRAY.

REFERENCES CITED

The following references are of record in the file of this patent:

UNITED STATES PATENTS

| Number | Name | Date |
| --- | --- | --- |
| 1,908,172 | Ross | Apr. 16, 1935 |
| 2,158,047 | Weston | May 9, 1939 |
| 2,294,777 | Heyer | Sept. 1, 1942 |
| 2,317,339 | Steven | Apr. 20, 1943 |
| 2,356,772 | Magee | Aug. 29, 1944 |
| 2,420,100 | Salsburg | May 6, 1947 |

FOREIGN PATENTS

| Number | Country | Date |
| --- | --- | --- |
| 11,449 | Great Britain | May 31, 1905 |